US010354575B2

(12) United States Patent
Yang et al.

(10) Patent No.: US 10,354,575 B2
(45) Date of Patent: Jul. 16, 2019

(54) ORGANIC LIGHT EMITTING DIODE DISPLAY DEVICE

(71) Applicant: SAMSUNG DISPLAY CO., LTD., Yongin-si, Gyeonggi-do (KR)

(72) Inventors: Sumin Yang, Yongin-si (KR); Jinwoo Park, Seoul (KR); Minseok Bae, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/708,976

(22) Filed: Sep. 19, 2017

(65) Prior Publication Data

US 2018/0082625 A1 Mar. 22, 2018

(30) Foreign Application Priority Data

Sep. 22, 2016 (KR) ........................ 10-2016-0121537

(51) Int. Cl.
*G09G 5/10* (2006.01)
*G06F 3/038* (2013.01)
(Continued)

(52) U.S. Cl.
CPC ......... *G09G 3/2018* (2013.01); *G09G 3/3233* (2013.01); *G09G 3/3258* (2013.01);
(Continued)

(58) Field of Classification Search
CPC ......... G09G 3/3233; G09G 2320/0233; G09G 3/3275
See application file for complete search history.

(56) References Cited

U.S. PATENT DOCUMENTS

| | | | |
|---|---|---|---|
| 8,736,638 | B2 | 5/2014 | Shirouzu |
| 2007/0109284 | A1 | 5/2007 | Yamazaki |

(Continued)

FOREIGN PATENT DOCUMENTS

| | | |
|---|---|---|
| JP | 5302915 | 6/2013 |
| KR | 10-2004-0111381 | 12/2004 |

(Continued)

OTHER PUBLICATIONS

European Search Report for Application No. 17192771.8 dated Jan. 3, 2018.

*Primary Examiner* — Nan-Ying Yang
(74) *Attorney, Agent, or Firm* — F. Chau & Associates, LLC

(57) ABSTRACT

An organic light emitting diode (OLED) display device includes an OLED display panel having gate lines, data lines intersecting the gate lines, and a plurality of pixels connected to the gate lines and the data lines. A timing controller receives an image signal of a plurality of frames and outputs image data based on the plurality of frames. A data driver generates a data signal voltage corresponding to the image data output from the timing controller. When the image signal includes a black image signal to one pixel of the plurality of pixels that continues for at least a predetermined plurality of frames, the timing controller outputs a first image data in which the black image signal has been converted to a first gray level value that is greater than a gray level value of the black image signal.

19 Claims, 18 Drawing Sheets

(51) Int. Cl.

| | |
|---|---|
| ***G09G 5/00*** | (2006.01) |
| ***G09G 3/20*** | (2006.01) |
| ***G09G 3/3275*** | (2016.01) |
| ***G09G 3/3258*** | (2016.01) |
| ***G09G 3/3233*** | (2016.01) |
| *G09G 3/3266* | (2016.01) |

(52) U.S. Cl.

CPC ......... *G09G 3/3275* (2013.01); *G09G 3/3266* (2013.01); *G09G 2300/0426* (2013.01); *G09G 2300/0452* (2013.01); *G09G 2310/08* (2013.01); *G09G 2320/0209* (2013.01); *G09G 2320/0233* (2013.01); *G09G 2320/0238* (2013.01); *G09G 2320/0285* (2013.01); *G09G 2320/04* (2013.01); *G09G 2320/045* (2013.01); *G09G 2320/0693* (2013.01); *G09G 2320/103* (2013.01)

(56) References Cited

U.S. PATENT DOCUMENTS

2008/0246784 A1* 10/2008 Mori .................... G09G 3/3648 345/690
2010/0090217 A1* 4/2010 Akimoto ............. H01L 29/7869 257/E21.46
2011/0043551 A1 2/2011 Kikuta
2013/0201223 A1* 8/2013 Li ........................ G09G 3/2022 345/690
2013/0293597 A1 11/2013 Mori et al.

FOREIGN PATENT DOCUMENTS

KR 10-2015-0074802 7/2015
KR 10-2016-0007759 1/2016
KR 10-2017-0021678 2/2017

* cited by examiner

FIG. 10a

| R | G | B | R | G | B | R | G | B |
|---|---|---|---|---|---|---|---|---|
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |
| 0 | 255 | 0 | 0 | 255 | 0 | 0 | 255 | 0 |

FIG. 10b

| R | G | B | R | G | B | R | G | B |
|---|---|---|---|---|---|---|---|---|
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |
| 8 | 0 | 8 | 8 | 0 | 8 | 8 | 0 | 8 |

FIG. 10c

| R | G | B | R | G | B | R | G | B |
|---|---|---|---|---|---|---|---|---|
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |
| 255 | 8 | 8 | 255 | 8 | 8 | 255 | 8 | 8 |

FIG. 11a

| R | G | B | R | G | B | R | G | B |
|---|---|---|---|---|---|---|---|---|
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |
| 0 | 128 | 0 | 0 | 128 | 0 | 0 | 128 | 0 |

FIG. 11b

| R | G | B | R | G | B | R | G | B |
|---|---|---|---|---|---|---|---|---|
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |
| 4 | 0 | 4 | 4 | 0 | 4 | 4 | 0 | 4 |

FIG. 11c

| R | G | B | R | G | B | R | G | B | R |
|---|---|---|---|---|---|---|---|---|---|
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |
| 4 | 128 | 4 | 4 | 128 | 4 | 4 | 128 | 4 | 4 |

FIG. 13a

| R | G | B | R | G | B | R | G | B |
|---|---|---|---|---|---|---|---|---|
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |

FIG. 13b

| R | G | B | R | G | B | R | G | B |
|---|---|---|---|---|---|---|---|---|
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |
| 0 | 0 | 0 | 0 | 0 | 0 | 0 | 0 | 0 |
| 8 | 0 | 8 | 8 | 0 | 8 | 8 | 0 | 8 |

| R | G | B | R | G | B | R | G | B | R | G | B | R | G | B |
|---|---|---|---|---|---|---|---|---|---|---|---|---|---|---|
| 0 | 0 | 0 | 0 | 0 | 0 | 255 | 255 | 255 | 0 | 0 | 0 | 0 | 0 | 0 |
| 0 | 0 | 0 | 0 | 0 | 0 | 255 | 255 | 255 | 0 | 0 | 0 | 0 | 0 | 0 |
| 0 | 0 | 0 | 0 | 0 | 0 | 255 | 255 | 255 | 0 | 0 | 0 | 0 | 0 | 0 |
| 0 | 0 | 0 | 0 | 0 | 0 | 255 | 255 | 255 | 0 | 0 | 0 | 0 | 0 | 0 |
| 0 | 0 | 0 | 0 | 0 | 0 | 255 | 255 | 255 | 0 | 0 | 0 | 0 | 0 | 0 |
| 0 | 0 | 0 | 0 | 0 | 0 | 255 | 255 | 255 | 255 | 255 | 255 | 255 | 255 | 255 |
| 0 | 0 | 0 | 0 | 0 | 0 | 255 | 255 | 255 | 255 | 255 | 255 | 255 | 255 | 255 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 16

| R | G | B | R | G | B | R | G | B | R | G | B | R | G | B |
|---|---|---|---|---|---|---|---|---|---|---|---|---|---|---|
| 8 | 8 | 8 | 8 | 8 | 8 | 255 | 255 | 255 | 8 | 8 | 8 | 8 | 8 | 8 |
| 8 | 8 | 8 | 8 | 8 | 8 | 255 | 255 | 255 | 8 | 8 | 8 | 8 | 8 | 8 |
| 8 | 8 | 8 | 8 | 8 | 8 | 255 | 255 | 255 | 8 | 8 | 8 | 8 | 8 | 8 |
| 8 | 8 | 8 | 8 | 8 | 8 | 255 | 255 | 255 | 8 | 8 | 8 | 8 | 8 | 8 |
| 8 | 8 | 8 | 8 | 8 | 8 | 255 | 255 | 255 | 8 | 8 | 8 | 8 | 8 | 8 |
| 8 | 8 | 8 | 8 | 8 | 8 | 255 | 255 | 255 | 255 | 255 | 255 | 255 | 255 | 255 |
| 8 | 8 | 8 | 8 | 8 | 8 | 255 | 255 | 255 | 255 | 255 | 255 | 255 | 255 | 255 |
| 8 | 8 | 8 | 8 | 8 | 8 | 8 | 8 | 8 | 8 | 8 | 8 | 8 | 8 | 8 |
| 8 | 8 | 8 | 8 | 8 | 8 | 8 | 8 | 8 | 8 | 8 | 8 | 8 | 8 | 8 |

FIG. 17

| R | G | B | R | G | B | R | G | B | R | G | B | R | G | B |
|---|---|---|---|---|---|---|---|---|---|---|---|---|---|---|
| 4 | 4 | 4 | 8 | 8 | 8 | 255 | 255 | 255 | 8 | 8 | 8 | 4 | 4 | 4 |
| 4 | 4 | 4 | 8 | 8 | 8 | 255 | 255 | 255 | 8 | 8 | 8 | 4 | 4 | 4 |
| 4 | 4 | 4 | 8 | 8 | 8 | 255 | 255 | 255 | 8 | 8 | 8 | 4 | 4 | 4 |
| 4 | 4 | 4 | 8 | 8 | 8 | 255 | 255 | 255 | 8 | 8 | 8 | 4 | 4 | 4 |
| 4 | 4 | 4 | 8 | 8 | 8 | 255 | 255 | 255 | 8 | 8 | 8 | 8 | 8 | 8 |
| 4 | 4 | 4 | 8 | 8 | 8 | 255 | 255 | 255 | 255 | 255 | 255 | 255 | 255 | 255 |
| 4 | 4 | 4 | 8 | 8 | 8 | 255 | 255 | 255 | 255 | 255 | 255 | 255 | 255 | 255 |
| 4 | 4 | 4 | 8 | 8 | 8 | 8 | 8 | 8 | 8 | 8 | 8 | 8 | 8 | 8 |
| 4 | 4 | 4 | 4 | 4 | 4 | 4 | 4 | 4 | 4 | 4 | 4 | 4 | 4 | 4 |

ORGANIC LIGHT EMITTING DIODE DISPLAY DEVICE

CROSS-REFERENCE TO RELATED APPLICATION

This application claims priority under 35 U.S.C. § 119 to Korean Patent Application No. 10-2016-0121537, filed on Sep. 22, 2016, in the Korean Intellectual Property Office (KIPO), the disclosure of which is incorporated by reference herein in its entirety.

Technical Field

Exemplary embodiments of the present invention relate to a display device, and more particularly, to an organic light emitting diode ("OLED") display device and a method of driving the OLED display device.

Discussion of Related Art

Display devices generally include a plurality of pixels provided in an area defined by a black matrix and/or a pixel defining layer. Examples of display devices may include a liquid crystal display ("LCD") device, a plasma display panel ("PDP") device, and an organic light emitting diode ("OLED") display device.

In general, an OLED display device includes an insulating substrate, a thin film transistor ("TFT") disposed on the insulating substrate, a pixel electrode connected to the TFT, a partition wall dividing the pixel electrode, an organic layer disposed on the pixel electrode between the partition walls, and a common electrode disposed on the partition wall and the organic layer.

In such an example, the TFT controls light emission of the organic layer for each pixel area. A pixel electrode is disposed in each pixel area, and each pixel electrode is electrically isolated from an adjacent pixel electrode so that each pixel electrode may be independently driven. In addition, the partition walls that divide the pixel areas are formed to be higher than the pixel electrodes. The partition walls serve to divide pixel areas while substantially preventing a short circuit between the pixel electrodes. An organic layer including a hole injection layer and an organic light emitting layer is formed on the pixel electrode between the partition walls. An OLED having such a structure controls light emitted from the organic light emitting layer to display an image.

However, some of the light generated in the organic light emitting layer does not contribute to the display of the image. The lost light propagates inside the pixels and the peripheral pixels, thereby contributing to a deterioration of a TFT in the pixel.

SUMMARY

An organic light emitting diode (OLED) display device includes an organic light emitting diode display panel having a plurality of gate lines, a plurality of data lines intersecting the plurality of gate lines, and a plurality of pixels connected to the plurality of gate lines and the plurality of data lines. A timing controller receives an image signal of a plurality of frames and outputs image data based on the plurality of frames. A data driver generates a data signal voltage corresponding to the image data output from the timing controler. When the image signal includes a black image signal to one pixel of the plurality of pixels that continues for at least a predetermined plurality of frames, the timing controller outputs a first image data in which the black image signal has been converted to a first gray level value that is greater than a gray level value of the black image signal.

A method of compensating for light-induced deterioration of an organic light emitting diode (OLED) display device includes receiving an image signal having image information. The received image signal is analyzed and a light-induced deteioration predictive image signal is detected therefrom. A black image signal of the light-induced deterioration predictive image signal is detected and light-induced deterioration gray level compensating value is calculated therefrom. The light-induced deterioration predictive image signal is compensated with the light-induced deterioration gray level compensating value and a light-induced deterioration compensated image data is generated therefrom. The light-induced deterioration compensated image data is output.

A method of driving an organic light emitting diode (OLED) display device, includes receiving an image signal. The image signal is analyzed to identify a region in which relatively high gray level values are relatively constant across multiple frames and are substantially surrounded by relatively low gray values. The identified relatively low gray values are modified by increasing the relatively low gray values.

BRIEF DESCRIPTION OF THE DRAWINGS

A more complete appreciation of the present disclosure and many of the attendant aspects thereof will become more apparent by describing in detail exemplary embodiments thereof with reference to the accompanying drawings, wherein:

FIG. 10A is a light-induced deterioration predictive image signal according to an exemplary embodiment of the present invention;

FIG. 10B is a light-induced deterioration gray level compensating value according to an exemplary embodiment of the present invention;

FIG. 10C is light-induced deterioration compensated image data according to an exemplary embodiment of the present invention;

FIG. 11A is a light-induced deterioration predictive image signal according to an exemplary embodiment of the present invention;

FIG. 11B is a light-induced deterioration gray level compensating value according to an exemplary embodiment of the present invention;

FIG. 11C is a light-induced deterioration compensated image data according to an exemplary embodiment of the present invention;

FIG. 13A illustrates a first light-induced deterioration gray level compensating value according to an exemplary embodiment of the present invention;

FIG. 13B illustrates a second light-induced deterioration gray level compensating value according to an exemplary embodiment of the present invention;

FIG. 16 is a light-induced deterioration compensated image data employing a light-induced deterioration gray level compensating value according to an exemplary embodiment of the present invention;

FIG. 17 is a light-induced deterioration compensated image data employing a light-induced deterioration gray level compensating value according to an exemplary embodiment of the present invention;

DETAILED DESCRIPTION

Figure 1:
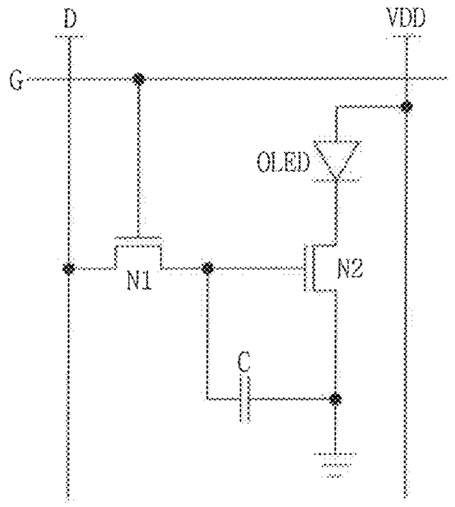
FIG. 1 is an equivalent circuit diagram illustrating one pixel of an active matrix type organic light emitting diode ("AMOLED") display device according to exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

In the drawings, the lengths and thicknesses of the illustrated elements may be exaggerated for clarity and ease of description thereof. When a layer, area, or other element is referred to as being "on" another layer, area, or other element, it may be directly on the other layer, area, or other element, or intervening layers, areas, or other elements may be present therebetween.

Like reference numerals may refer to like elements throughout the specification.

FIG. 1 is an equivalent circuit diagram illustrating one pixel of an active matrix type organic light emitting diode ("AMOLED") display device in accordance with an exemplary embodiment of the present invention.

Referring to FIG. 1, a pixel of the OLED display device includes a gate line G and a data line D, and further includes a switching transistor N1, a capacitor C, a driving transistor N2, and an organic light emitting diode ("OLED") disposed between the gate line G and the data line D. In such an exemplary embodiment, each of the switching transistor N1 and the driving transistor N2 may be a thin film transistor ("TFT") including amorphous silicon (a-Si: H) or a TFT including an oxide based on a metal such as indium (In), gallium (Ga), zinc (Zn), tin (Sn) and/or titanium (Ti).

A gate electrode of the switching transistor N1 is connected to the gate line G and a source electrode of the switching transistor N1 is connected to the data line D. One side of the capacitor C is connected to a drain electrode of the switching transistor N1 and another side of the capacitor C is grounded (GND) like a source electrode of the driving transistor N2.

A drain electrode of the driving transistor N2 is connected to a cathode electrode of the OLED to which a driving voltage VDD is applied. A gate electrode of the driving transistor N2 is connected to the drain electrode of the switching transistor N1. The source electrode of the driving transistor N2 is grounded (GND).

In addition, the switching transistor N1 is turned on in response to a gate signal applied from the gate line G to allow a current to flow between the source electrode and the drain electrode of the switching transistor N1. A data signal voltage, applied from the data line D during a turn-on period of the switching transistor N1, is applied to the gate electrode of the driving transistor N2 and the capacitor C via the source electrode and the drain electrode of the switching transistor N1.

The driving transistor N2 controls a current flowing through the OLED according to the data signal voltage applied to the gate electrode of the driving transistor N2. Further, the capacitor C stores the data signal voltage and then maintains the data signal voltage at a constant level for one frame period of the OLED display device.

Figure 2:
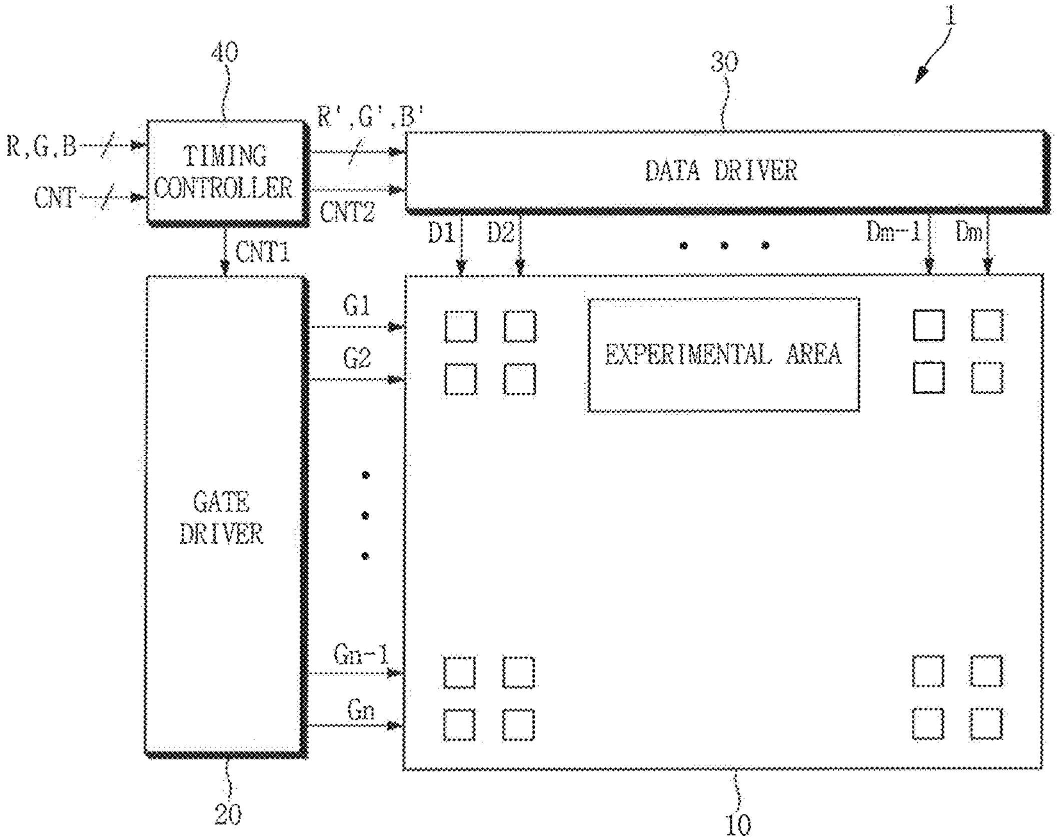
FIG. 2 is a circuit diagram illustrating a comparative display device.

FIG. 2 is a circuit diagram illustrating a comparative display device.

Referring to FIG. 2, the OLED display device 1 may include an OLED display panel 10, a gate driver 20, a data driver 30, and a timing controller 40.

A plurality of gate lines G1 to Gn and a plurality of data lines D1 to Dm are formed in the OLED display panel. The gate lines G1 to Gn and the data lines D1 to Dm intersect one another and define pixel areas.

In addition, as illustrated in FIG. 1, the switching transistor N1, the driving transistor N2, the capacitor C and the OLED may be disposed in each pixel area P.

A red pixel R, a green pixel G and a blue pixel B may be disposed in the pixel area of the OLED display panel 10. The pixels may be arranged in the form of a checkerboard or a stripe pattern.

The gate driver 20 may generate a gate signal based on a gate control signal CNT1 applied from the timing controller 40 and may sequentially apply the gate signal to the plurality of gate lines G1 to Gn of the OLED display panel 10.

The data driver 30 may generate a data signal voltage based on a data control signal CNT2 and an image data R', G' and B' applied from the timing controller 40 and may apply the data signal voltage to the plurality of data lines D1 to Dm of the OLED display panel 10.

The timing controller 40 may generate the gate control signal CNT1 and the data control signal. CNT2 for controlling the gate driver 20 and the data driver 30, respectively, based on a control signal CNT applied thereto, e.g., a vertical synchronization signal, a horizontal synchronization signal, a clock signal and a data enable signal. The gate control signal CNT1 and the data control signal CNT2 may be output to the gate driver 20 and the data driver 30, respectively.

Figure 3:
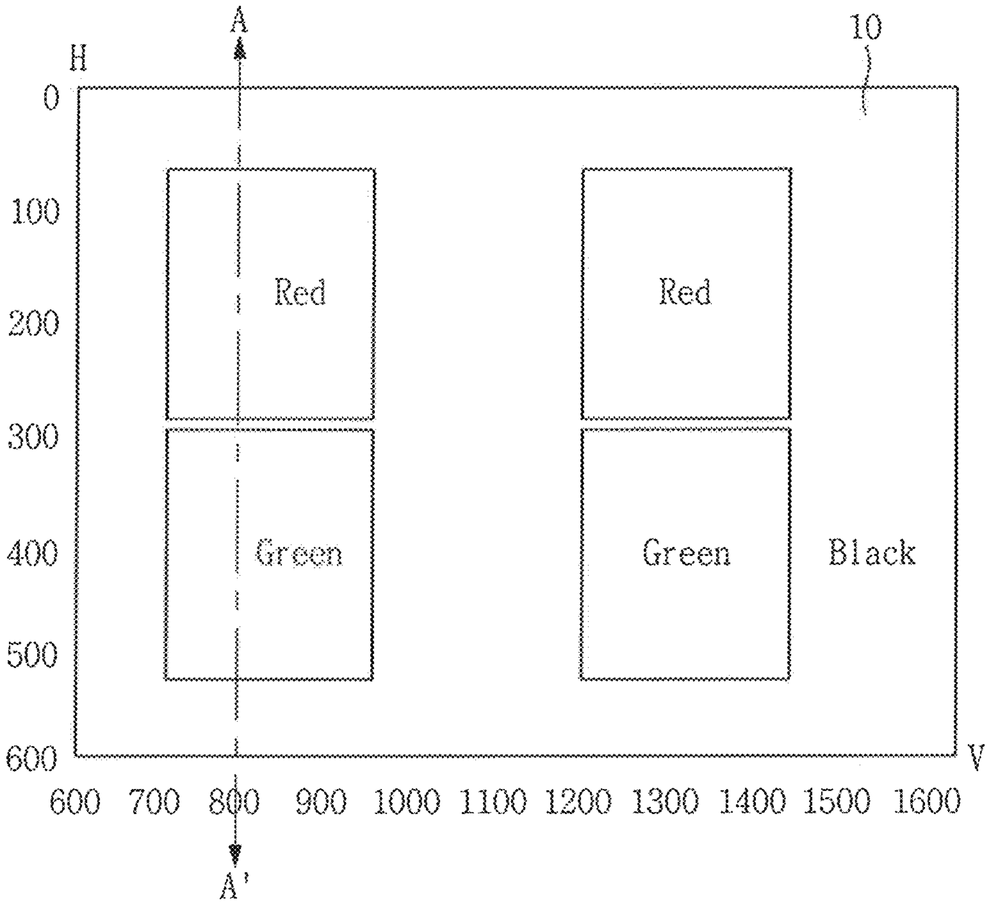
FIG. 3 is a light-induced deterioration experimental image of a comparative OLED display panel.

FIG. 3 is a light-induced deterioration experimental image of a comparative OLED display panel.

A screen area of the OLED display panel 10 illustrated in FIG. 3 corresponds to a horizontal line 0 to a horizontal line 600 in direction H, and corresponds to a vertical line 600 to a vertical line 1600 in direction V. An experimental image includes two red box images in an upper portion of the screen and two green box images located adjacent to and below the two red box images, respectively. In the screen area, a peripheral area in which the red box image and the green box image are not displayed is located within a non-light emitting state.

In an area displaying the red box image, a red pixel (hereinafter, "a pixel R") emits light of a gray level 255, e.g, a maximum brightness. A green pixel (hereinafter, "a pixel G") and a blue pixel (hereinafter, "a pixel B") do not emit light, and have a gray level 0, e.g. a minimum brightness. In an area displaying the green box image, a pixel G emits light of a gray level 255, and a pixel R and a pixel B do not emit light, having a gray level 0.

According to the experiment, a turn-on threshold voltage (hereinafter, "a voltage Vth") of the driving transistor N2 in the pixel R is measured in an initial state (time=0 hr) before the experimental image is displayed on the OLEIC display panel 10. Then, after the experimental image is displayed continuously for 5 hours (time=5 hr), the voltage Vth of the pixel R is measured. In addition, after the experimental image is displayed continuously for 144 hours (time=144 hr), the voltage Vth of the pixel R is measured. During the experiment, the experimental image is input to the OLED display panel 10 as a fixed image without variation (e.g. a still image).

Figure 4:
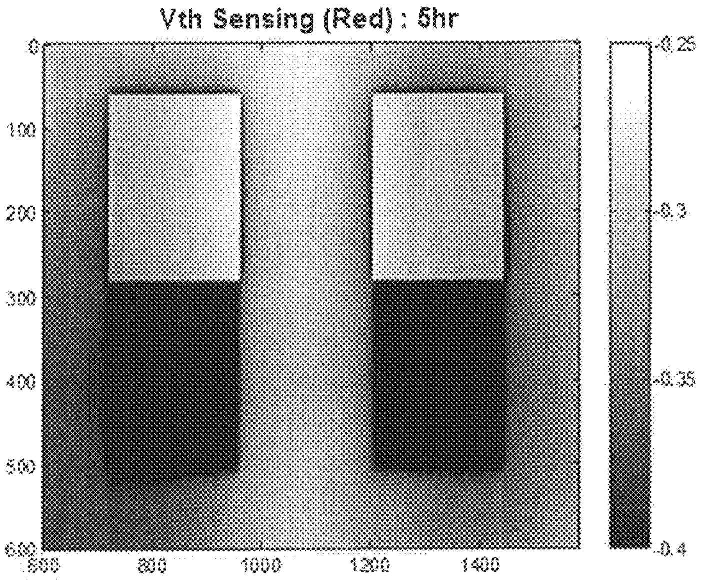
FIG. 4 is a result data image after displaying the experimental image of FIG. 3.

FIG. 4 illustrates a resultant data image after displaying the experimental image of FIG. 3.

FIG. 4 illustrates the result of measuring a voltage Vth of a pixel R after the experimental image of FIG. 3 is continuously displayed for 5 hours (time=5 hr).

Referring to FIG. 4, an upper portion of the screen in which the red box image is displayed for 5 hours is represented in light gray, and a voltage Vth of a pixel R has a value of about −0.3 V. On the other hand, a lower portion of the screen in which the green box image is displayed is represented in dark gray, and a voltage Vth of a pixel R has a value of about −0.4 V or less. A peripheral area around the red box image and the green box image in which light has not been emitted for 5 hours is represented in gray, and a voltage Vth of a pixel R in the peripheral area has a value in a range of about −0.25 V to about −0.35 V. The voltage Vth of the pixel R in the peripheral area is relatively low in pixels located closer to the red box image and the green box image, and relatively high in pixels spaced farther front the red box image and the green box image.

Figure 5:
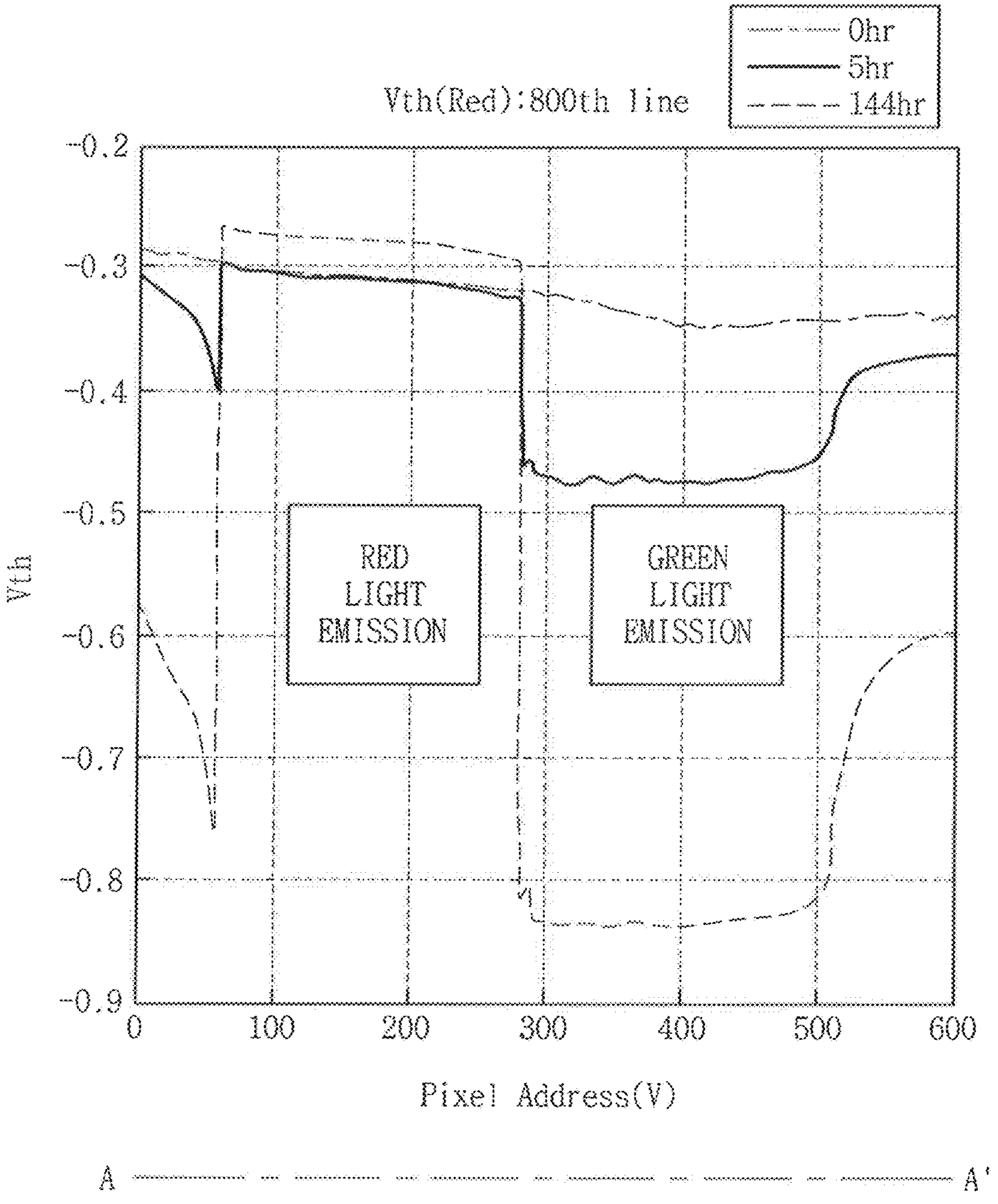
FIG. 5 is a graph illustrating a voltage Vth from the experimental result of FIG. 3.

FIG. 5 is a graph illustrating a voltage Vth from the experimental result of FIG. 3.

The graph in FIG. 5 illustrates a voltage Vth of a pixel R located at line A-A' illustrated in FIG. 3. The horizontal axis of the graph represents a position of the pixel R in the OLED display panel, and the vertical axis represents a voltage Vth of the pixel R.

The graph at time=0 hr illustrates the voltage Vth of the pixel R measured before displaying the experimental image. The graph at time=5 hr illustrates the voltage Vth of the pixel R after continuously displaying the experimental image for 5 hours (time=5 hr), and the graph at time=144 hr illustrates the voltage Vth of the pixel R after continuously displaying the experimental image for 144 hours (time=144 hr).

Referring to FIG. 5, the graph at time=0 hr illustrates that the voltage Vth is kept at a substantially constant level within a range of about −0.3 V to about −0.33 V in the pixel R from the horizontal line 0 to the horizontal line 600.

In the graph at time=5 hr, the voltage Vth of the pixel R varies depending on the position. In an area from a horizontal line 61 to a horizontal line 280 in which the red box image is displayed, the pixel R maintains the voltage Vth in a range of about −0.3 V to about −0.32 V, while in an area from a horizontal line 291 to a horizontal line 510 in which the green box image is displayed, the voltage Vth of the pixel R drops to about −0.48 V. The voltage Vth of the pixel R varies by about 0.16 V depending on the difference in the experimental image. The difference in the voltage Vth of the pixel R may further increase as the continuous light emission time of the experimental image increases.

The graph at time=144 hr illustrates the voltage Vth of the pixel R ranging from about −0.2678 V to −0.2968 V in an area from the horizontal line 61 to the horizontal line 280. In an area where the pixel R emits light to display the red box image, the voltage Vth of the pixel R does not experience a great change with the lapse of the light emission time. In an area from the horizontal line 291 to the horizontal line 510 in which the green box image is displayed, the voltage Vth of the pixel R is in a range of about −0.8333 V to about −0.787 V.

In an area where a pixel R does not emit light while a pixel adjacent to the pixel R emits light, a voltage Vth of the pixel R changes largely in accordance with a light emission time. When measured after displaying the experimental image for 144 hours, a voltage Vth of a pixel R in a reference line 800 varies by about 0.5 V depending on whether the pixel R emits light.

The graph of FIG. 5 shows that the voltage Vth of the pixel R is affected by whether the pixel R is turned on and by whether the adjacent pixel (e.g., the pixel G or the pixel B) is turned on and a light emission time of the adjacent pixel. In particular, a voltage Vth of one pixel that does not emit light may be significantly lowered in the case where another pixel in a peripheral area emits light for a long period of time.

Figure 6:
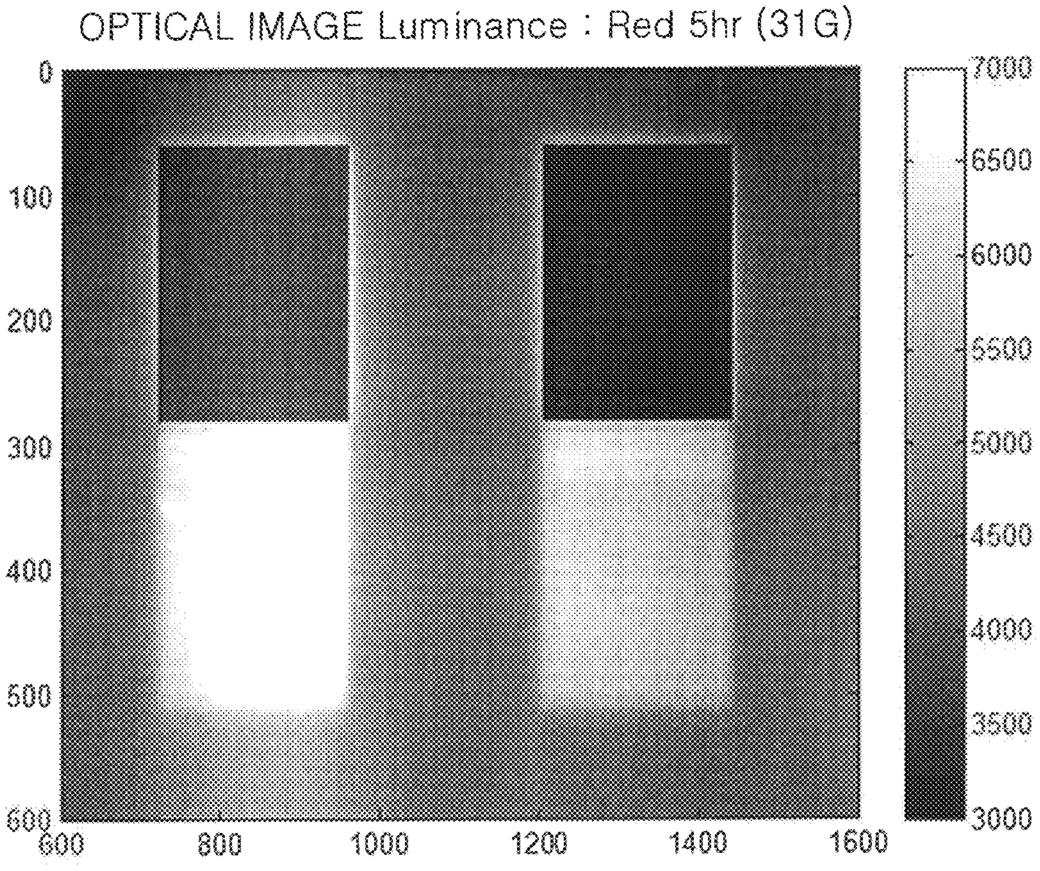
FIG. 6 is an image illustrating light emission of a pixel according to the experiment of FIG. 4.

FIG. 6 is an image illustrating an OLED display panel according to the experiment of FIG. 4.

FIG. 6 is an image pictured when a pixel R of an OLED display panel emits light with a data signal voltage of a gray level 31 (31G) after the red pixel image and the green box image are continuously displayed for 5 hours as in FIG. 4.

Referring to FIGS. 5 and 6, a voltage Vth of a pixel R in an area where the red box image is displayed is about −0.32 V. A voltage Vth of a pixel R in an area where the green box image is displayed is about −0.48 V, which is lower than the voltage Vth of the pixel R in the area where the red box image is displayed. A driving voltage of the pixel R in the area where the green box image is displayed is higher than a driving voltage of the pixel R in the area where the red box image is displayed by about 0.16 V due to the effect of light-induced deterioration.

When a data signal voltage of a gray level 31 (31G) is applied to a pixel R, a driving voltage applied to a light emitting layer of the pixel R is determined based on a difference between the data signal voltage and a voltage Vth of a driving transistor in the pixel R.

As the voltage Vth of the pixel is lowered, the driving voltage of the pixel increases, and thus light may be emitted with a higher luminance than an applied gray value. Due to a deviation in the voltage Vth of the pixel arising from light-induced deterioration, the OLED display panel may exhibit uneven luminance.

Referring to FIG. 6, it is identified that there is a pixel emitting light with a relatively high luminance in a part of the periphery of an area in which the red box image is displayed. In this periphery of the area in which the red box image is displayed, the voltage Vth is lowered as a result of light emitted from the pixel R displaying the red box image.

Based on the experimental result of FIGS. 4, 5 and 6, when the green box image is displayed on the OLED display panel, a light output from a pixel G deteriorates a TFT of a pixel R, and the light-induced deterioration phenomenon in which the voltage Vth of the deteriorated TFT has a tendency toward a more negative voltage occurs in the pixel R. The light-induced deterioration phenomenon occurs to a greater extent in the case where an oxide semiconductor layer is applied to a TFT of the pixel. The light-induced deterioration of the TFT may occur due to the material properties of the oxide semiconductor layer.

Examples of a material forming the oxide semiconductor layer may include an oxide based on a metal such as zinc (Zn), indium (In), gallium (Ga), tin (Sn) and titanium (Ti), or a compound of a metal, such as zinc (Zn), indium (In), gallium (Ga), tin (Sn) and titanium (Ti), and an oxide thereof. For example, the oxide semiconductor material may include at least one selected from the group consisting of: zinc oxide (ZnO), zinc-tin oxide (ZTO), zinc-indium oxide (ZIO), indium oxide (InO), titanium oxide (TiO), indium-gallium-zinc oxide (IGZO) and indium-zinc-tin oxide (IZTO).

Figure 7:
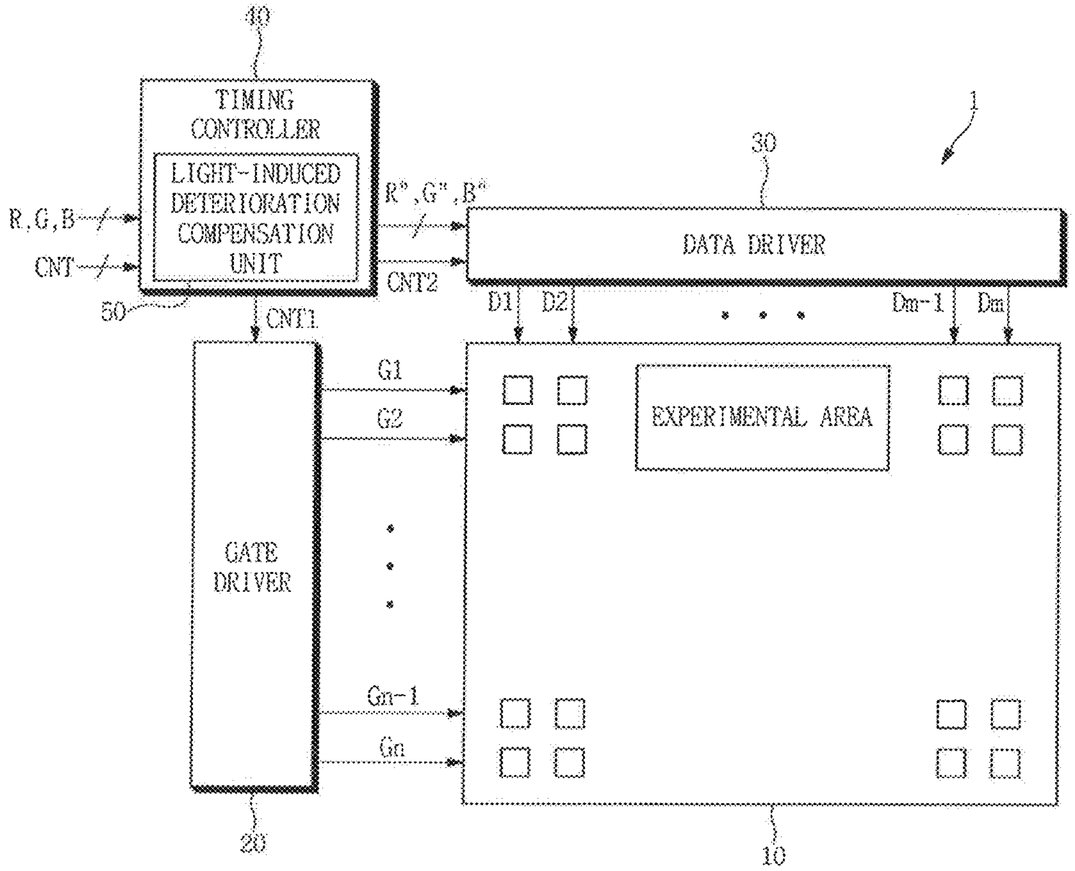
FIG. 7 is a configuration view illustrating an OLED display device according to an exemplary embodiment of the present invention.

FIG. 7 is a configuration view illustrating an OLED display device 1 according to an exemplary embodiment of the present invention.

Referring to FIG. 7, the timing controller 40 of the OLED display device 1, according to an exemplary embodiment of the present invention, may further include a light-induced deterioration compensation unit 50.

The configurations of the OLED display panel 10, the gate driver 20, and the data driver 30 may be the same as or similar to those corresponding elements illustrated in FIG. 2.

The timing controller 40 receives the control signal CST and the image signal R, G and B provided thereto from an external source, determines an image signal that may undergo light-induced deterioration as a light-induced deterioration predictive image signal, and outputs a light-induced deterioration compensated image data R", G" and B" to the data driver 30.

The data driver 30 may generate a data signal voltage using the data control signal CNT2 and the light-induced deterioration compensated image data R", G" and B" provided thereto from the timing controller 40, and apply the data signal voltage to the plurality of data lines D1 to Dm of the OLED display panel 10.

Figure 8:
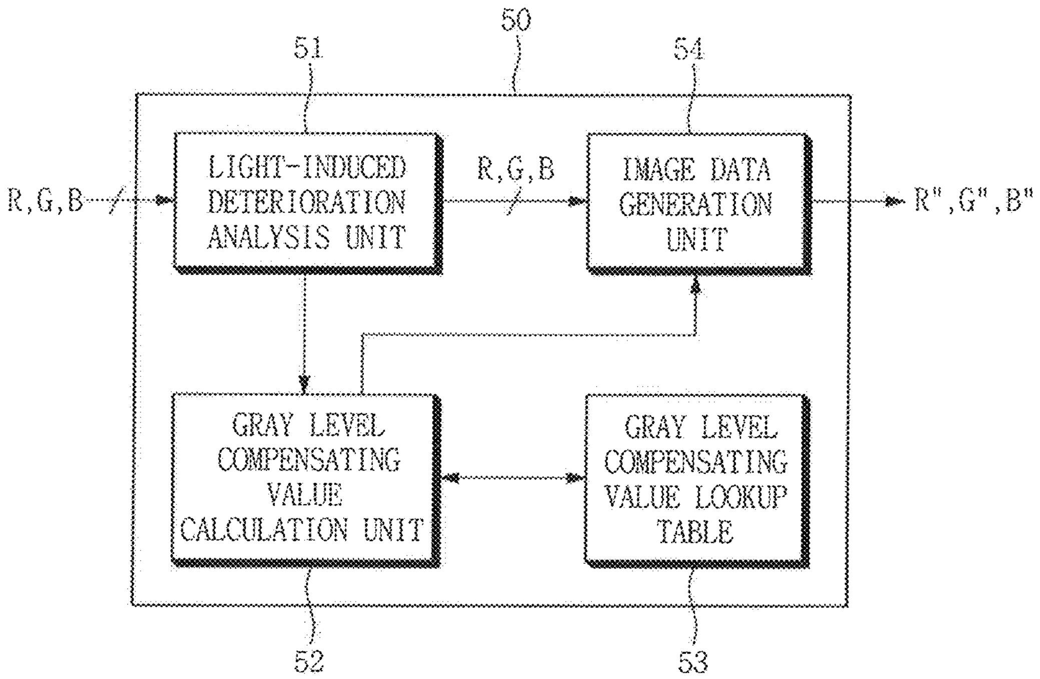
FIG. 8 is an internal configuration view illustrating a light-induced deterioration compensation unit according to an exemplary embodiment of the present invention.

FIG. 8 is an internal configuration view illustrating a light-induced deterioration compensation unit according to an exemplary embodiment of the present invention.

Referring to FIG. 8, the light-induced deterioration compensation unit 50 at the timing controller 40 receives the image signal R, G and B input to the timing controller 40, predicts possible light-induced deterioration that may occur in the OLED display panel 10, and outputs, to the data driver 30, the light-induced deterioration compensated image data R", G" and B" compensated not to cause light-induced deterioration.

The light-induced deterioration compensation unit 50 may include a light-induced deterioration analysis unit 51, a gray level compensating value calculation unit 52, a gray level compensating value lookup table 53 and a light-induced deterioration compensated image data generation unit 54.

The light-induced deterioration analysis unit 51 may analyze the input image signal R, G and B to determine an image signal that is expected to undergo light-induced deterioration, and set a light-induced deterioration predictive image signal. To determine the light-induced deterioration, an image signal driving a same pixel with a gray level above a reference gray level value for a plurality of frames is detected, a black image signal driving a pixel located in the periphery of said same pixel is detected, and thereafter the corresponding image signals are set as a light-induced deterioration predictive image signal. The light-induced deterioration analysis unit 51 may determine that the light-induced deterioration may occur when the black image signal continues for 10 frames or more.

The light-induced deterioration predictive image signal may include both an image signal displaying a substantially same still image over a plurality of frames and an image signal displaying a black gray level (e.g. gray level 0) in the periphery of the still image. In such an exemplary embodiment, the black gray level may include a gray level having a gray level value of 0 and a gray level having a value lower than a light-induced deterioration compensating gray level value. For example, the black gray level may have a gray level value in a range of a gray level 0 to a gray level 4, and the light-induced deterioration compensating gray level value may be in a range of 2 to 8.

In general, when viewing a video signal, such as a television broadcast, on the OLED display device 1, a logo of a broadcasting company is displayed as a still image emitting light for a long period of time at a fixed position. Accordingly, light-induced deterioration might occur in non-light emitting pixels located in the periphery of the logo. The light-induced deterioration analysis unit 51 may analyze input image signals in adjacent pixels on the basis of a plurality of frames to set a light-induced deterioration predictive image signal.

Figure 9:
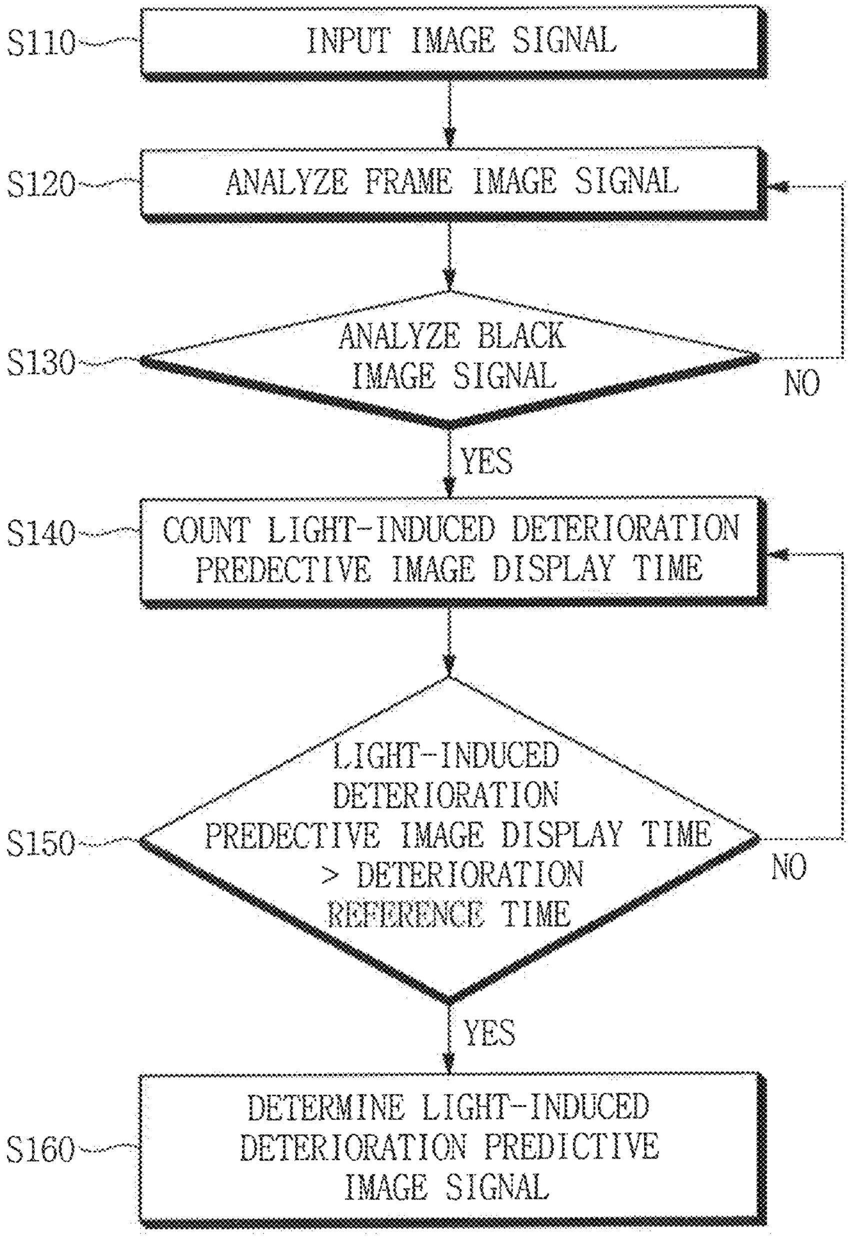
FIG. 9 is a flowchart illustrating an operation of a light-induced deterioration analysis unit according to an exemplary embodiment of the present invention.

FIG. 9 is a flowchart illustrating an operation of the light-induced deterioration analysis unit 51 according to an exemplary embodiment of the present invention.

First, the light-induced deterioration analysis unit 51 receives the image signal R, G and B from an external source (S110).

The light-induced deterioration analysis unit 51 analyzes the input image signal R, G and B of a plurality of successive frames to detect a still image that does not move in a plurality of frames (S120). In general, an image signal of a non-moving image is present at a substantially same position and has a substantially constant value over a plurality of frame signals (the number of which may be predetermined). Accordingly, the still image may be detected by subtracting image signals of successive frames. A pixel or an area of which a result of subtraction operation between two frames is 0 may mean that the position of the image is fixed between at least two frames. In the case where the two frames are extended to frames spanning several seconds, a still image displayed on the screen may be detected. As described above, the still image may include an image such as a logo of a broadcasting company or a time display, and when the display device is used as a monitor, a partial area of a computer program may correspond to the still image (such as, for example, a menu bar or other stationary user interface elements).

The light-induced deterioration analysis unit 51 analyzes the image signal of the frame to extract a still image, and analyzes a black image signal applied to a pixel adjacent to the pixel in which the still image is displayed (S130). The pixel receiving the black image signal does not emit light or emits light with a significantly low gray level and thus may experience light-induced deterioration by an output light of the still image of an adjacent pixel. Although there is a pixel in which a still image is displayed, in the case where a pixel adjacent thereto does not receive a black image signal, it is determined that the possibility of light-induced deterioration is low, and the process returns to a step of analyzing an image signal again.

In the case where a black image signal is detected in a pixel adjacent to a pixel in which a still image is displayed, the light-induced deterioration analysis unit 51 counts a display time of the image signal that is likely to cause deterioration (S140). In this step, both a display time of the still image and duration of a non-light emitting state of an adjacent pixel are taken into account and accumulated.

The light-induced deterioration analysis unit 51 compares the display time of the light-induced deterioration predicted image with a preset deterioration reference time (S150). Since the condition to cause light-induced deterioration varies depending on the structure of the OLED display panel and the characteristics of a pixel TFT, the deterioration reference time is not particularly fixed and may be set in a range from several seconds to several tens of minutes, as determined by the structure of the OLED display panel and the characteristics of the pixel TFTs).

In the case where the display time of the light-induced deterioration predicted image exceeds the deterioration reference time, the light-induced deterioration analysis unit 51 sets the corresponding image signal as a light-induced deterioration predictive image signal (S160). The deterioration reference time may be determined based on the characteristics of the OLED display panel.

The light-induced deterioration analysis unit 51 transmits the determined light-induced deterioration predictive image signal to the gray level compensating value calculation unit 52. The gray level compensating value calculation unit 52 calculates a light-induced deterioration gray level compensating value to compensate for a black image signal which is likely to cause light-induced deterioration with an image signal of a relatively low gray level.

FIG. 10A is a light-induced predictive image signal according to an exemplary embodiment of the present invention, FIG. 10B is a light-induced deterioration gray level compensating value according to an exemplary embodiment of the present invention, and FIG. 10C is light-induced deterioration compensated image data according to an exemplary embodiment of the present invention.

FIG. 10A illustrates a light-induced deterioration predictive image signal of a 9×9 pixel area including pixels R, pixels G and pixels B in the area of the green box image in the experimental image of FIG. 3. In the OLED display panel applied with a data signal voltage corresponding to the light-induced deterioration predictive image signal of FIG. 10A, in the area of the green box image, the pixel G displays a gray level of 255 (e.g. a substantially maximum luminance), and the pixel R and the pixel B do not emit light (e.g. a substantially minimum luminance). In TFTs of the pixel R and the pixel B, light-induced deterioration in which the voltage Vth of the pixel R and the pixel B is lowered due to a light output from the adjacent pixel G may occur.

The light-induced deterioration analysis unit 51 detects the light-induced deterioration predictive image signal illustrated in FIG. 10A from an input image signal and transmits the light-induced deterioration predictive image signal to the gray level compensating value calculation unit 52. The light-induced deterioration predictive image signal is an image signal having display gray level values corresponding to pixels in a predetermined area. Although described herein with reference to a gray level table, the light-induced deterioration predictive image signal may be configured differently from the examples of the present invention described above.

The gray level compensating value may be a gray level having a relatively low gray level value ranging from 2 to 8 that may turn on an adjacent pixel displaying an otherwise black gray level predicted to cause light-induced deterioration. In an exemplary embodiment of the present invention, an adjacent pixel of one pixel refers to a neighboring pixel sharing a boundary with the one pixel and a peripheral pixel of one pixel refers to a pixel in an area affected by a light output from said one pixel (e.g. a pixel that is close to but not necessarily adjacent to the one pixel).

FIG. 10B is a light-induced deterioration gray level compensating value according to an exemplary embodiment of the present invention. When a light-induced deterioration predictive image signal of FIG. 10A is displayed on the OLED display panel for a relatively long period of time, the voltage Vth of the driving TFTs of the pixel R and the pixel B may be lowered by the light-induced deterioration.

The gray level compensating value calculation unit 52 assigns a gray level 0 to an image signal of the pixel G of which an input image gray level corresponds to a still image, and assigns a light-induced deterioration compensating value of a gray level 8 to image signals of the pixel R and the pixel B of which an input image gray level corresponds to a black image signal.

In an exemplary embodiment of the present invention, although a gray level 8 is selected as a light-induced deterioration compensating value by way of example, the light-induced deterioration gray level compensating value may have a different value that is determined according to a gray level value of a light emitting pixel and a distance with respect to the light emitting pixel.

The light-induced deterioration gray level compensating value selected based on the gray level value of the light emitting pixel and the distance with respect to the light emitting pixel, as variables, may be separately stored in a gray level compensating value lookup table 53. The stored light-induced deterioration gray level compensating value may be referred to by the gray level compensating value calculation unit 52. The gray level compensating value calculation unit 52 transmits the selected light-induced deterioration gray level compensating value to the light-induced deterioration compensated image data generation unit 54.

FIG. 10C illustrates a light-induced deterioration compensated image data compensated by the light-induced deterioration compensated image data generation unit 54. The light-induced deterioration compensated image data generation unit 54 compensates the input image signal R, G and B with the light-induced deterioration gray level compensating value transmitted from the gray level compensating value calculation unit 52 to generate the light induced deterioration compensated image data R", G" and B". Referring to the light-induced deterioration compensated image data of FIG. 10C, the gray level of pixel R maintains a gray level value of 255 of the input signal, and the gray levels of the pixel G and the pixel B are set as a light-induced deterioration gray level compensating value of 8 generated by the gray level compensating value calculation unit 52.

FIG. 11A is a light-induced deterioration predictive image signal according to an exemplary embodiment of the present invention, FIG. 11B is a light-induced deterioration gray level compensating value according to an exemplary embodiment of the present invention, and FIG. 11C is a light-induced deterioration compensated image data according to an exemplary embodiment of the present invention.

Referring to FIG. 11A, as for the light-induced deterioration predictive image signal, the gray level of the pixel G is a gray level 128, and the gray levels of the pixel R and the pixel B adjacent to the pixel G has a gray level 0. The pixel G has a gray level 128, which is an intermediate value among a set of gray levels ranging from 0 to 255, and compared to the case of displaying a gray level 255, a maximum gray level, the pixel G displaying a gray level 128 may induce less light-induced deterioration in a non-light emitting pixel.

Referring to the light-induced deterioration gray level compensating value in FIG. 11B, the gray level compensating value calculation unit 52 assigns a gray level 0 to the gray level of the pixel G which is a light emitting pixel, and assigns a gray level 4 as the light-induced deterioration gray level compensating value to the gray levels of the pixel R and the pixel B which are non-light emitting pixels. The gray level compensating value calculation unit 52 may select a gray level 4, lower than a gray level 8, as the light-induced deterioration gray level compensating value, considering that the gray level value of the adjacent pixel G is 12*a* gray level 8.

FIG. 11C is a light-induced deterioration compensated image data generated by the light-induced deterioration compensated image data generation unit 54. The light-induced deterioration compensated image data generation unit 54 compensates the light-induced deterioration predictive image signal illustrated in FIG. 11A with the light-induced deterioration gray level compensating value applied from the gray level compensating value calculation unit 52 illustrated in FIG. 11B to generate the light-induced deterioration compensated image data.

Referring to FIG. 11C, as for the case of the light-induced deterioration compensated image data, the gray level of the pixel G maintains an input gray level value and the pixel R and the pixel B, which are vulnerable to light-induced deterioration, with the light-induced deterioration gray level compensating value of a gray level 4 generated from the gray level compensating value calculation unit 52. The pixel R and the pixel B applied with the light-induced deterioration compensated image data may emit light in a gray level 4, thereby rendering those pixels less influenced by the light-induced deterioration that may occur by the light output from the pixel G.

Figure 12:
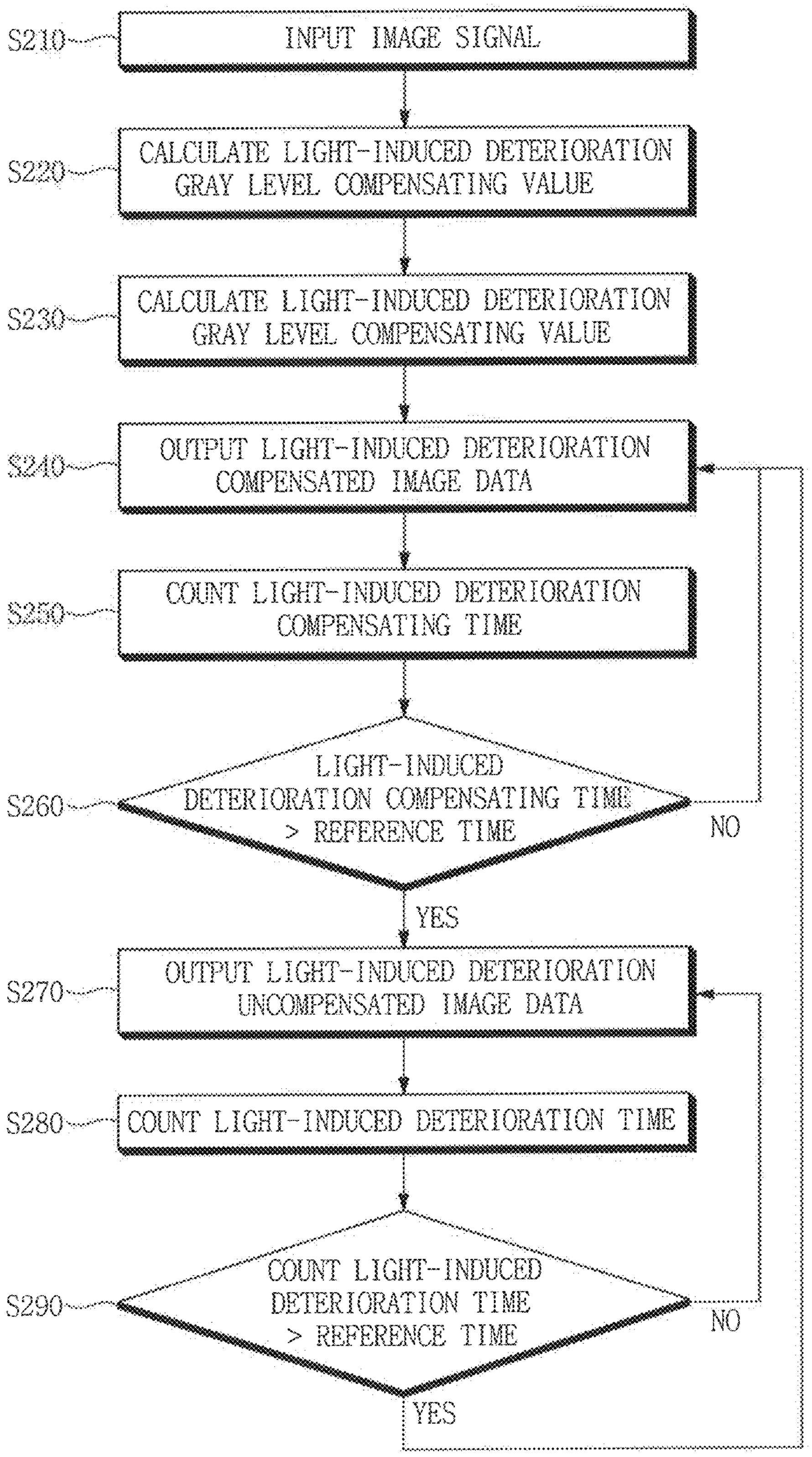
FIG. 12 is a flowchart illustrating a method of preventing light-induced deterioration according to an exemplary embodiment of the present invention.

FIG. 12 is a flowchart illustrating a method of compensating for light-induced deterioration according to an exemplary embodiment of the present invention.

Referring to FIG. 12, a light-induced deterioration compensated image data generation unit 54 may selectively output a light-induced deterioration compensated image data and a light-induced deterioration uncompensated image data so that a contrast of the OLED display device is not degraded by the light-induced deterioration compensation.

In addition, the light-induced deterioration compensated image data generation unit 54 may alternately output the light-induced deterioration compensated image data and the light-induced deterioration uncompensated image data at periodic intervals.

The light-induced deterioration analysis unit 51 receives an image signal to be displayed on the OLED display panel (S210).

The input image signal is analyzed such that a light-induced deterioration predictive image signal is set (S220). The set light-induced deterioration predictive image signal is transmitted to the gray level compensating value calculation unit 52.

The gray level compensating value calculation unit 52 sets a light-induced deterioration gray level compensating value of the image signal so that non-light emitting pixels that would otherwise be susceptible to light-induced deterioration may be compensated for and may thereby emit light (S230).

The light-induced deterioration compensated image data generation unit 54 compensates the input light-induced deterioration predictive image signal with the light-induced deterioration gray level compensating value and outputs the light-induced deterioration compensated image data (S240).

The light-induced deterioration compensated image data generation unit 54 counts light-induced deterioration compensating time during which the light-induced deterioration compensated image data is output (S250).

The light-induced deterioration compensated image data generation unit 54 compares the light-induced deterioration compensating time with a preset reference time (S260). The light-induced deterioration compensated image data generation unit 54 outputs the light-induced deterioration compensated image data until the light-induced deterioration compensating time exceeds the preset reference time.

When the light-induced deterioration compensating time exceeds the preset reference time, the light-induced deterioration compensated image data generation unit 54 stops outputting the light-induced deterioration compensated image data, and outputs the light-induced deterioration uncompensated image data, generated from the input image signal, of which light-induced deterioration is not compensated (S270).

The light-induced deterioration compensated image data generation unit 54 counts light-induced deterioration time while outputting the light-induced deterioration uncompensated image data (S280).

The light-induced deterioration compensated image data generation unit 54 compares the light-induced deterioration time with a preset reference deterioration time (S290). When the light-induced deterioration time does not exceed the preset reference deterioration time, the light-induced deterioration compensated image data generation unit 54 outputs the light-induced deterioration uncompensated image data.

When the light-induced deterioration time exceeds the reference deterioration time, the light-induced deterioration compensated image data generation unit 54 moves to a step of outputting a light-induced deterioration compensated image data reflecting the light-induced deterioration gray level compensating value.

As such, as the light-induced deterioration compensated image data generation unit 54 alternately displays the light-induced deterioration compensated image data and the light-induced deterioration uncompensated image data periodically, the light-induced deterioration may be substantially prevented while maintaining a desired level of contrast within the screen in an OLED display device according to an exemplary embodiment of the present invention.

FIG. 13A illustrates a first light-induced deterioration gray level compensating value according to an exemplary embodiment of the present invention, and FIG. 13B illustrates a second light-induced deterioration gray level compensating value according to an exemplary embodiment of the present invention.

FIGS. 13A and 13B respectively illustrate first and second light-induced deterioration gray level compensating values each configured so that light-induced deterioration gray level compensating values alternate on the basis of horizontal line.

The first light-induced deterioration gray level compensating value illustrated in FIG. 13A is configured so that the pixels R and the pixels B in odd-numbered horizontal lines are represented with a gray level 0, and the pixels R and the pixels B in even-numbered horizontal lines are represented with a gray level 8.

The second light-induced deterioration gray level compensating value illustrated in FIG. 13B is configured so that the pixels R and the pixels B in odd-numbered horizontal lines are represented with a gray level 8, and the pixels R and the pixels B in even-numbered horizontal lines are represented with a gray level 0.

The gray level compensating value calculation unit 52 alternately outputs the first light-induced deterioration gray level compensating value and the second light-induced deterioration gray level compensating value to be used for deterioration compensation in the light-induced deterioration compensated image data generation unit 54. In an exemplary embodiment of the present invention, as pixels in upper and lower portions on the display screen alternately emit light with the light-induced deterioration gray level compensating value, light-induced deterioration may be compensated without causing contrast degradation.

The first and second light-induced deterioration gray level compensating values in FIGS. 13A and 13B may be alternately output on the basis of an image frame.

In an exemplary embodiment of the present invention, the light-induced deterioration gray level compensating value may be converted in synchronization with a time point at which an image configuration displayed on the screen changes through the image signal analysis. The image signal analysis may be determined by, for example, analyzing a histogram of an image information. When an amount of change of the histogram information for each color is at or above a predetermined level, it may be determined that conversion of a channel or an image cut occurs. In the case where a light-induced deterioration gray level compensation pattern is switched in synchronization with the time point at which the screen changes, a screen of the light-induced deterioration gray level compensating value being changed might not be easily recognized by a user.

In addition, a method of converting the light-induced deterioration image pattern and the light-induced deterioration gray level compensation pattern may vary based on the degree of light-induced deterioration of the particular OLED display device and various other considerations.

Figures 14, 15:
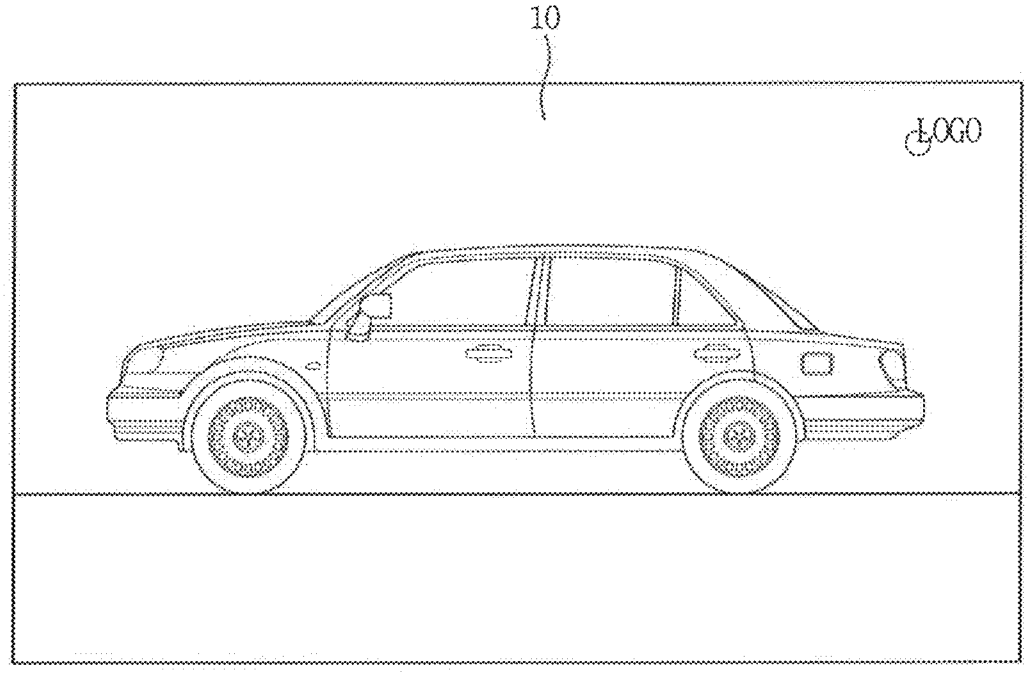
FIG. 14 is a diagram illustrating a light-induced deterioration compensation area of an OLED display panel according to an exemplary embodiment of the present invention.
FIG. 15 is an enlarged view illustrating a light-induced deterioration predictive image signal of an area displaying a logo in FIG. 14.

FIG. 14 is an explanatory view illustrating a light-induced deterioration compensation area of an OLED display panel 10 according to an exemplary embodiment of the present invention.

Referring to FIG. 14, the OLED display panel 10 displays a moving image of a car, and displays a logo of a broadcasting company at a fixed position on an upper right side. Since an image having a motion, like a car, has a mix of a light emitting state and a non-light emitting state of the pixel, a voltage Vth of a certain pixel may be rarely changed due to light-induced deterioration. However, a still image, such as a logo of a broadcasting company, which emits light with a high luminance at a substantially same position may cause light-induced deterioration in a non-emitting pixel in an area adjacent to a light emitting pixel area, such that luminance unevenness may occur in the OLED display panel 10.

FIG. 15 illustrates an example of a light-induced deterioration predictive image signal of a display screen of FIG. 14.

Referring to FIG. 15, a logo LOGO is displayed as a white character with a relatively high luminance whereby each of a pixel R, a pixel G, and a pixel B has a gray level of 255. An image signal of each of a pixel R, a pixel G, and a pixel B in the periphery of a light emitting pixel area in which the logo LOGO is displayed has a black gray level (e.g. a gray level 0).

The logo LOGO is displayed on the OLED display panel 10 for a relatively long period of time and may be set as a light-induced deterioration predictive image signal.

FIG. 16 is a light-induced deterioration compensated image data according to an exemplary embodiment of the present invention.

Referring to FIG. 16, with respect to the light-induced deterioration predictive image signal of FIG. 15, the light-induced deterioration compensation unit 50 assigns a light-induced deterioration gray level compensating value of 8 to a non-light emitting pixel in the periphery of a light emitting pixel in which light-induced deterioration may occur according to the light-induced deterioration predictive image signal to generate a light-induced deterioration compensated image data.

Referring to FIG. 16, a light-induced gray level compensating value of 8 may be assigned to a non-light emitting pixel spaced apart from a light emitting pixel by 6 pixels.

In an exemplary embodiment of the present invention, a range of the non-light emitting pixels in the peripheral area corresponds to a distance affected by a light output from the light emitting pixel, and may be experimentally determined based on light emission of the light emitting pixel, the size of the pixel, the distance between pixels, and characteristics of the pixel TFT.

FIG. 17 illustrates a light-induced deterioration compensated image data according to an exemplary embodiment of the present invention.

Referring to FIG. 17, with respect to the light-induced deterioration predictive image signal of FIG. 15, the light-induced deterioration compensation unit 50 assigns a light-induced gray level compensating value of 8 or 4 to a black image signal applied to a pixel spaced apart from a light emitting pixel according to the light-induced deterioration predictive image signal to generate a light-induced deterioration compensated image data.

Because a degree of light-induced deterioration is proportional to an output light incident to pixels in the peripheral area, as a distance from the light emitting pixel increases, a lower light-induced deterioration gray level compensating value may be applied. When compensated with a less light-induced deterioration gray level compensating value in accordance with an increase in distance, the display screen of the light-induced deterioration compensated image data might not become rough. In an exemplary embodiment of the present invention, the light-induced deterioration gray level compensating value of two stages is taken as an example, but more steps may be set.

In the case where the light-induced deterioration compensated image data is applied, a substantially same light-induced deterioration gray level compensating value may be assigned to a pixel R, a pixel G, and a pixel B so that color artifacts might not be visually recognized in a low gray level environment.

Figure 18:
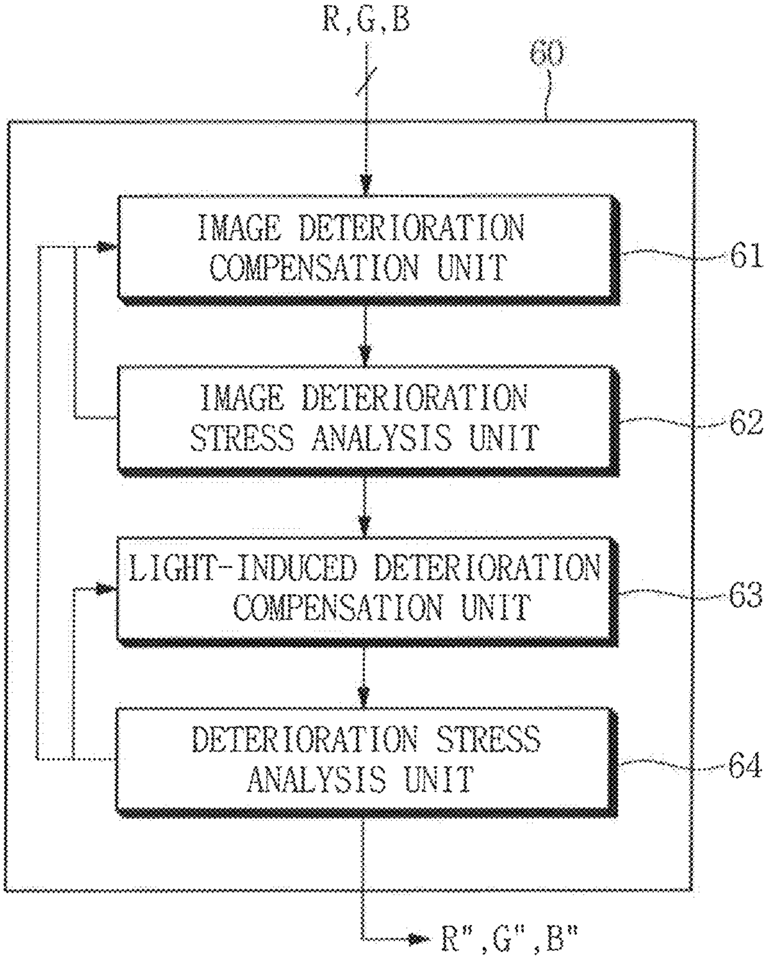
FIG. 18 is a diagram illustrating a deterioration compensation unit according to an exemplary embodiment of the present invention.

FIG. 18 is a configuration view illustrating a deterioration compensation unit 60 according to an exemplary embodiment of the present invention.

Referring to FIG. 18, the deterioration compensation unit 60 may include an image deterioration compensation unit 61, an image deterioration stress analysis unit 62, a light-induced deterioration compensation unit 63, and a deterioration stress analysis unit 64.

The image deterioration compensation unit 61 may substantially prevent deterioration of an organic light emitting layer of a pixel caused by a same pixel emitting light for a relatively long period of time. The image deterioration compensation unit 61 detects a still image and moves the display screen including the still image to an upper or lower and/or left or right direction by one to two unit pixels on the OLED display panel. The image deterioration compensation unit 61 may move the entire screen on the pixel basis or may move only a part of the entire screen where image sticking occurs.

The image deterioration stress analysis unit 62 may analyze image deterioration occurring in the image screen moved by the image deterioration compensation unit 61. The image deterioration corresponds to a deterioration occurring in a light emitting pixel, and image sticking that may occur afterwards may be predicted through the image deterioration stress analysis. The image deterioration stress analysis unit 62 is configured to separately measure the influence of the image deterioration.

The light-induced deterioration compensation unit 63 compensates for the light-induced deterioration occurring in a non-light emitting pixel in the periphery of a pixel that emits light for a relatively long period of time. The light-induced deterioration compensation unit 63 detects a still image and, when the still image is detected, compensates for an image signal so that the non-light emitting pixel in the peripheral area may emit light with a relatively low gray level.

The deterioration stress analysis unit 64 analyzes deterioration stress of the image signal compensated by the image deterioration compensation unit 61 and the light-induced deterioration compensation unit 63. The image signals compensated for deterioration are accumulated and the accumulated image signals are modeled. The image signal modeling may include accumulating output image signals and converting them to a maximum gray level for an accumulation time. With respect to the converted maximum gray level for the accumulation time, a deterioration stress may be analyzed for each panel based on the characteristics of the panel. The deterioration stress analysis unit 64 transmits the deterioration stress for each panel to the image deterioration compensation unit 61 and/or the light-induced deterioration compensation unit 63. The image deterioration compensation unit 61 and the light-induced deterioration compensation unit 63 may determine whether to compensate for the deterioration and adjust the deterioration compensating value based on the deterioration stress applied thereto.

Figure 19:
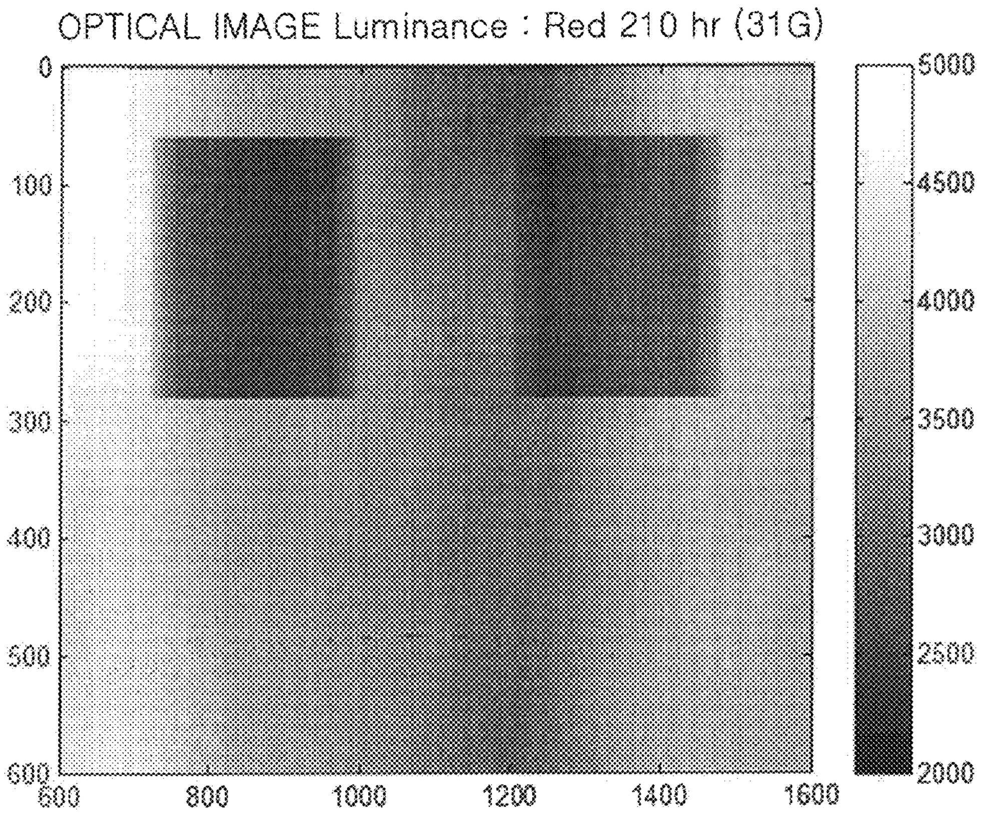
FIG. 19 is an image of an OLED display device according to an exemplary embodiment of the present invention.

FIG. 19 is a display image of an OLED display device according to an exemplary embodiment of the present invention.

FIG. 19 illustrates a pictured image of a light emitting state of a pixel R when a data signal voltage of a gray level 31 (31G) is applied to the pixel R of the OLED display panel 10 after a red box image and a green box image are continuously displayed for 210 hours (time=210 hr) on the screen of the OLED display panel 10.

The display image includes two red box images in the upper portion of the screen and two green box images below the two red box images, respectively. In the red box image, a pixel R represents a gray level 255 (e.g. a maximum brightness), and a pixel G and a pixel B represent a gray level 8 (which is a relatively low gray level within the scale of 0 to 255). As for the green box image, a pixel 0 represents 255 gray level and a pixel R and a pixel B represent a gray level 8.

Referring to FIG. 19, it is verified that the luminance unevenness caused by the light-induced deterioration of the pixel R that occurs in the green area is corrected, as compared with the results of lighting experiment for 5 hours shown in FIG. 6.

As such, according to an exemplary embodiment of the present invention, a change in the voltage Vth due to light-induced deterioration may be suppressed and the luminance unevenness in the panel may be avoided by compensating for an image signal applied to a non-light emitting pixel in the periphery of a light emitting pixel area with the light-induced deterioration gray level compensating value of a relatively low gray level.

As set forth hereinabove, in one or more exemplary embodiments of the present invention, an OLED display may analyze an image signal input to the OLED display device, detect a light-induced deterioration predictive image signal predicting possible light-induced deterioration, and compensate for a black image signal of the light-induced deterioration predictive image signal with a relatively low gray level, such that light-induced deterioration may be avoided.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. An organic light emitting diode (OLED) display device comprising:

an organic light emitting diode display panel comprising a plurality of gate lines, a plurality of data lines intersecting the plurality of gate lines, and a plurality of pixels connected to the plurality of gate lines and the plurality of data lines;

a timing controller receiving an image signal of a plurality of frames and outputting image data based on the plurality of frames; and a data driver generating a data signal voltage corresponding to the image data output from the timing controller, wherein when the image signal includes a black image signal to one pixel of the plurality of pixels that continues for at least a predetermined plurality of frames within a predetermined distance from one or more high-level pixels of the plurality of pixels, the timing controller outputs a first image data in which the black image signal has been converted to a first gray level value that is greater than a gray level value of the black image signal, wherein the one or more high-level pixels have a gray level that is above a predetermined threshold.

2. The organic light emitting diode display device as claimed in claim 1, wherein the predetermined plurality of frames comprises at least ten successive frames.

3. The organic light emitting diode display device as claimed in claim 1, wherein when a minimum gray level of the image signal is defined as a gray level of 0 and a maximum gray level of the image signal is defined as a gray level of 256, the black image signal has a gray level value ranging from 0 to 4.

4. The organic light emitting diode display device as claimed in claim 3, wherein the first image data has a gray level value ranging from 2 to 8.

5. The organic light emitting diode display device as claimed in claim 4, wherein the first image data is given a greater gray level as a gray level value of an image signal applied to a pixel, of the plurality of pixels, that is adjacent to the one pixel becomes greater.

6. The organic light emitting diode display device as claimed in claim 4, wherein the first image data is given a lower gray level as a distance between the one pixel and a light emitting pixel, of the plurality of pixels, that is adjacent to the one pixel increases.

7. The organic light emitting diode display device as claimed in claim 1, wherein the timing controller alternately outputs the first image data and a second image data having a second gray level value different from the first gray level value during the plurality of frames.

8. The organic light emitting diode display device as claimed in claim 7, wherein the second gray level value is substantially equal to the gray level value of the black image signal.

9. The organic light emitting diode display device as claimed in claim 7, wherein the second gray level value is greater than the gray level value of the black image signal and less than the first gray level value.

10. The organic light emitting diode display device as claimed in claim 1, wherein the timing controller comprises:

a light-induced deterioration analysis unit setting a light-induced deterioration predictive image signal;

a gray level compensating value calculation unit receiving the light-induced deterioration predictive image signal from the light-induced deterioration analysis unit and calculating a light-induced deterioration gray level compensating value therefrom; and a light-induced deterioration compensated image data generation unit compensating for the light-induced deterioration predictive image signal with the light-induced deterioration gray level compensating value to generate a light-induced deterioration compensated image data.

11. The organic light emitting diode display device as claimed in claim 1, wherein the pixel comprises a thin film transistor comprising an oxide semiconductor layer.

12. The organic light emitting diode display device as claimed in claim 11, wherein the oxide semiconductor layer comprises at least one selected from the group consisting of: zinc oxide (ZnO), zinc-tin oxide (ZTO), zinc-indium oxide (ZIO), indium oxide (InO), titanium oxide (TiO), indium-gallium-zinc oxide (IGZO), and indium-zinc-tin oxide (IZTO).

13. A method of compensating for light-induced deterioration of an organic light emitting diode (OLED) display device, the method comprising:

receiving an image signal comprising image information;

analyzing the received image signal and detecting a light-induced deterioration predictive image signal therefrom;

detecting a black image signal of the light-induced deterioration predictive image signal and calculating a light-induced deterioration gray level compensating value therefrom;

compensating the light-induced deterioration predictive image signal with the light-induced deterioration gray level compensating value and generating a light-induced deterioration compensated image data therefrom; and outputting the light-induced deterioration compensated image data, wherein analyzing the received image signal and detecting a light-induced deterioration predictive image signal therefrom comprises:

detecting image signal driving a same pixel with a gray level higher than a reference gray level for a plurality of frames; and detecting a black image signal driving a peripheral pixel in a peripheral area of said same pixel and setting a light-induced deterioration predictive image signal.

14. The method as claimed in claim 13, wherein detecting a black image signal of the light-induced deterioration predictive image signal and calculating a light-induced deterioration gray level compensating value therefrom comprises:

producing a greater light-induced deterioration gray level compensating value as a gray level value of an image signal driving said same pixel among the light-induced deterioration predictive image signal increases.

15. A method of compensating for light-induced deterioration of an organic light emitting diode (OLED) display device, the method comprising:

receiving an image signal comprising image information;

analyzing the received image signal and detecting a light-induced deterioration predictive image signal therefrom;

detecting a black image signal of the light-induced deterioration predictive image signal and calculating a light-induced deterioration gray level compensating value therefrom;

compensating the light-induced deterioration predictive image signal with the light-induced deterioration gray level compensating value and generating a light-induced deterioration compensated image data therefrom; and outputting the light-induced deterioration compensated image data, wherein analyzing the received image signal and detecting a light-induced deterioration predictive image signal therefrom comprises:

detecting an image signal driving a same pixel with a pray level higher than a reference gray level for a plurality of frames; and detecting a black image driving a peripheral pixel in a peripheral area of said same pixel and setting a light-induced deterioration predictive image signal, wherein detecting a black image signal of the light-induced deterioration predictive image signal and calculating a light-induced deterioration gray level compensating value therefrom comprises: producing a greater light-induced deterioration gray level compensating value as a gray level value of an image signal driving said same pixel among the light-induced deterioration predictive image signal increases, and wherein detecting a black image signal of the light-induced deterioration predictive image signal and calculating a light-induced deterioration gray level compensating value therefrom comprises:

producing a less light-induced deterioration gray level compensating value as a distance between said same pixel and the peripheral pixel increases.

16. The method as claimed in claim 14, wherein detecting a black image signal of the light-induced deterioration predictive image signal and calculating a light-induced deterioration gray level compensating value therefrom comprises:

referring to a gray level compensating value stored in a gray level compensating value lookup table based on variables comprising the gray level value of said same pixel and a distance between said same pixel and the peripheral pixel.

17. The method as claimed in claim 14, wherein compensating the light-induced deterioration predictive image signal with the light-induced deterioration gray level compensating value and generating a light-induced deterioration compensated image data therefrom comprises:

inputting the light-induced deterioration gray level compensating value to a gray level of the black image signal comprised in the light-induced deterioration predictive image signal.

18. The method as claimed in claim 17, wherein outputting the light-induced deterioration compensated image data comprises:

selectively outputting the light-induced deterioration compensated image data and a light-induced deterioration uncompensated image data.

19. The method as claimed in claim 18, wherein outputting the light-induced deterioration compensated image data comprises:

alternately outputting the light-induced deterioration compensated image data and the light-induced deterioration uncompensated image data.

* * * * *